Feb. 19, 1957 A. F. GABRIEL ET AL 2,782,044
NON-ROTATING COLLET ACTUATOR
Filed April 21, 1955 2 Sheets-Sheet 1

Inventors
Adam F. Gabriel
Arthur G. Kozacka
Carlson, Pitzner, Hubbard & Wolfe
Attorneys

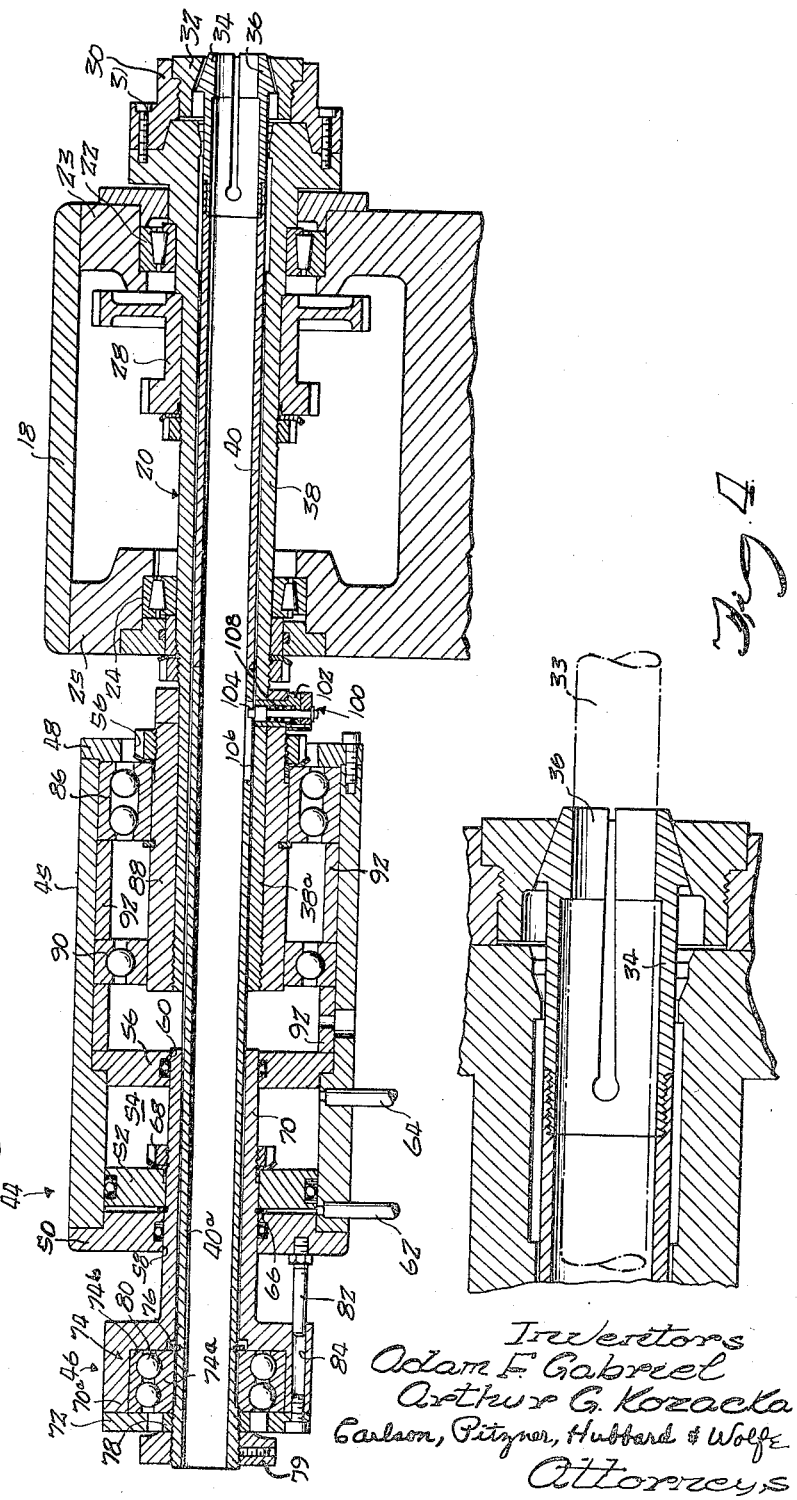

United States Patent Office 2,782,044
Patented Feb. 19, 1957

2,782,044

NON-ROTATING COLLET ACTUATOR

Adam F. Gabriel and Arthur G. Kozacka, Chicago, Ill., assignors to Acme Industrial Company, Chicago, Ill., a corporation of Illinois Application April 21, 1955, Serial No. 502,954

6 Claims. (Cl. 279—4)

The present invention relates to collet actuators of the type applied to lathes, automatic screw machines and other machine tools and more particularly to such actuators of the non-rotating type.

It has been known for years to employ hydraulic actuating mechanisms for opening and closing collets or chucks used with lathes and the like. Such mechanisms have generally included a piston reciprocable within a cylinder rigidly anchored to a machine base.

Prior constructions have, however, been attendant with many disadvantages. One of the most serious of these is that conventional collet actuators of this type have subjected the machine spindle guide bearings not only to the normal spindle loads but also to the gripping loads encountered in opening and closing the collet about a workpiece. For example, where it is desired to operate upon small workpieces at spindle speeds at high as 6,000 R. P. M., the collet gripping loads acting in combination with the forces rotating the machine spindle subject the spindle bearings to unusually severe wear so that such bearings have an extremely short useful life.

Accordingly, it is a general object of the present invention to provide a lathe collet actuator including a non-rotating cylinder and adapted to transmit the collet clamping forces through the actuator itself rather than through the machine spindle bearings, thus enabling such bearings to serve their normal useful life. It is an associated object of the invention to provide a non-rotating cylinder type collet actuator by means of which high lathe spindle speeds may be employed without unduly impairing the length of life or efficiency of the machine spindle bearings and without necessitating the use of special heavy-duty spindle bearings.

It is another object of the invention to provide a collet actuator including a non-rotating type cylinder which need not be rigidly anchored to a machine base and aligned therewith; consequently the mechanism is especially adaptable for use as an attachment for an existing machine tool.

This is particularly important since the supporting base for most conventional lathes and the like does not extend beyond the tool elements proper, thereby making connection of a fixedly anchored actuator awkward and impractical. It is a related object of the present invention, therefore, to provide an automatic collet actuator which is adaptable to be simply attached to the shaft of an existing machine, such as a lathe or screw machine.

It is a further object of the invention to provide an actuator for automatically opening and closing a machine tool collet or chuck, the actuator having a non-rotating cylinder including means for absorbing the clamping load resulting from the gripping of a workpiece by the collet and for supporting the weight of the cylinder independent of the machine base.

Finally, it is an object of the invention to provide a non-rotating cylinder type collet actuator which is inexpensive, simple, possesses a long operating life, and which requires a minimum of care and maintenance.

Other objects and advantages will become apparent upon reading the attached detailed description, and upon reference to the drawings, in which:

Fig. 3 is a longitudinal section of the illustrative embodiment of the invention showing the collet in a released or open position.

Fig. 4 is an enlarged section of the collet shown in Fig. 3 showing the collet in a gripping or closed position.

While the invention has been described in connection with the preferred embodiment, it will be understood that we do not intend to limit the invention thereto, but do intend to cover all modifications and alternative constructions falling within the spirit and scope of the appended claims.

Figure 1:
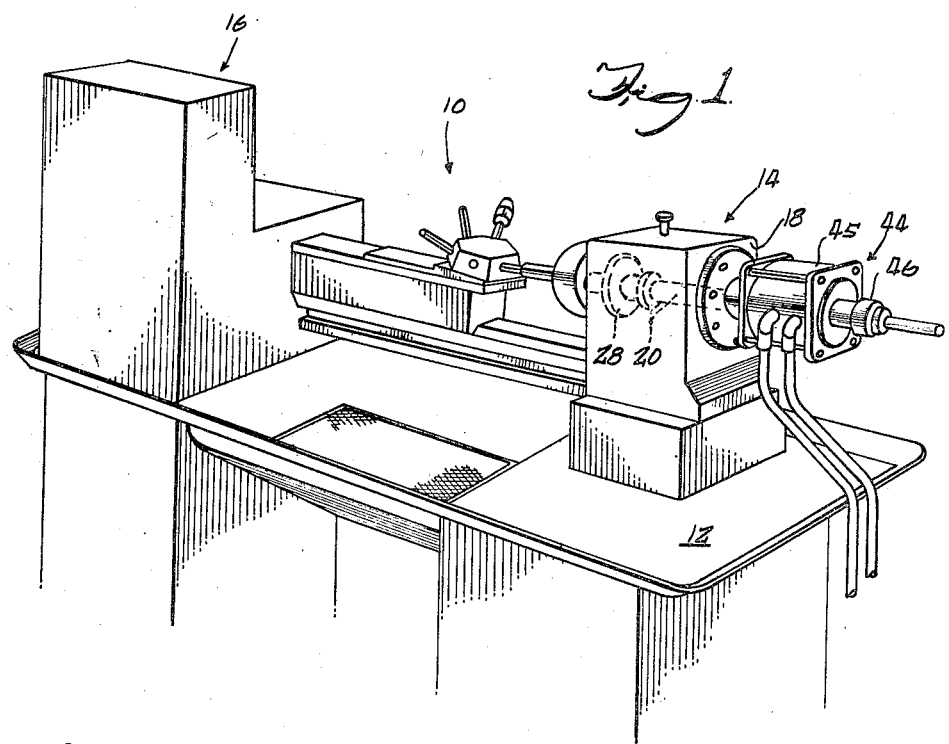
Figure 1 is a general perspective of a turret lathe equipped with an actuator constructed in accordance with the present invention.
Figure 2:
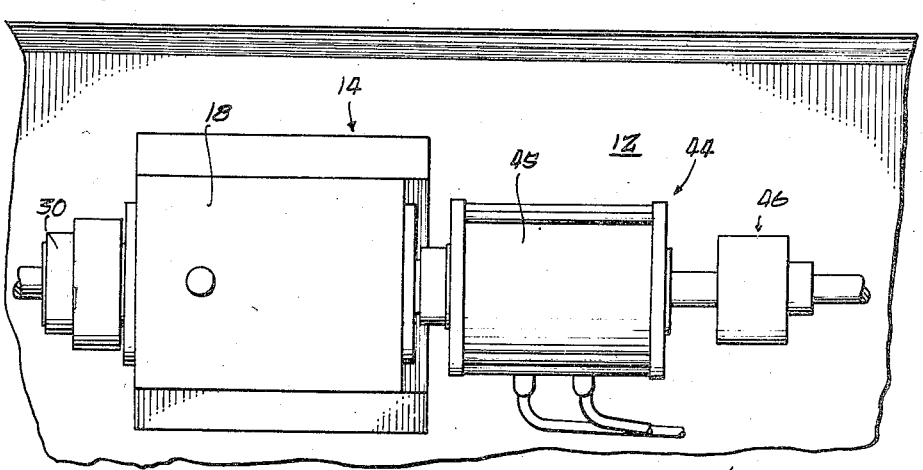
Fig. 2 is a plan view of one end of the lathe shown in Fig. 1.

Turning now to the drawings, the illustrative embodiment of the present invention is shown as associated with a machine tool, which in the present instance is a turret lathe 10, as shown in Figs. 1 and 2. It is understood that the invention may also be employed with a bench type lathe, automatic screw machine, or any machine which utilizes a collet or chuck for gripping a workpiece. The lathe 10 comprises a base 12 upon which is mounted a headstock 14 and a tailstock 16. The headstock 14 of the machine includes a hollow spindle head or housing 18 through which the machine's spindle 20 extends horizontally.

For mounting the spindle 20, inner and outer spindle bearings 22, 24 (Fig. 3), capable of transmitting thrust as well as radial loads, are disposed within the corresponding inner and outer side walls 23, 25, respectively, of the head 18. The spindle head 18 has a cavity for enclosing speed reduction gearing which transmits machine power from a remotely situated motor (not shown) to the spindle 20 through a suitable drive gear 28 firmly keyed to the spindle.

Upon an inspection of Figs. 3 and 4, it will be seen that the spindle 20 projects through the inner wall 23 of the head 18 and is shouldered at its inner end to engage an annular hub 30 to which the spindle is suitably coupled, as by machine screws 31. Concentric within the hub 30 and in screw-threaded engagement therewith is an axially disposed cone or nose piece 32. For the purpose of holding a workpiece 33 in the machine, a chuck or collet 34 having a plurality of peripherally disposed fingers 36 for engaging the workpiece is axially disposed within the nose piece 32. It is noted that the fingers 36 of the collet 34 have inclined outer surfaces adapted to cooperate in a camming action with the complementally inclined inner surface portions of the cone 32.

The machine spindle 20 comprises a hollow outer sleeve 38 mounted in the spindle bearings 22, 24, and extending through each of them, and a hollow inner draw tube 40 within the sleeve 38. The draw tube 40 has its central opening in axial alinement with the opening through the collet 34 so that the workpiece 33 may be fed through the spindle and collet from the outer end of the spindle. From the drawings, it is seen that the inner end of the draw tube 40 is adapted for screw threaded engagement with one end of the collet. The draw tube is also keyed within the sleeve 38 so as to be rotatable therewith and yet axially movable with respect thereto, as will be presently seen. Thus, by axially shifting the draw tube 40 inwardly within the outer sleeve portion 38 of the spindle 20, the collet 34 is correspondingly inwardly translated thereby causing the nose piece 32 to cam the collet fingers 36 into gripping engagement with the workpiece 33 placed within the collet. Release of the workpiece is accordingly effected by shifting the draw tube outwardly within the sleeve 38.

For actuating the draw tube 40 and collet 34 between open and closed positions of the collet, a non-rotating cylinder type actuator 44 is provided for attachment onto the outer end of the headstock 14, which mechanism includes means for transmitting the clamping load encountered in gripping the workpiece 33 and for supporting itself independently of the machine base 12. In this instance, the actuator 44 includes a horizontally disposed cylinder or housing 45 journaled about an outer extension 38a of the spindle sleeve 38 and carrying at its outer end a bearing assembly 46. As shown, the cylinder 45 is arranged so that the sleeve extension 38a terminates within the cylinder and intermediate the ends thereof while a portion 40a of the inner draw tube 40 extends completely through the cylinder and through the end bearing assembly 46. The purpose of this arrangement is to be described presently.

The cylinder 45 comprises a tubular housing enclosed by annular inner and outer end plates 48, 50, respectively, through which the spindle 20 passes. A fluid pressure operated piston 52 is axially reciprocable within an annular piston chamber 54 defined within the outer portion of the cylinder 45 by the outer end plate 50 and a parallel intermediate plate 56. The end plate 50 and the intermediate plate 56 both have central openings 58, 60, respectively, therein for receiving the draw tube 40a. Suitable pressure fluid connections 62 and 64 are provided in the cylinder 45 for selective connection to a pump and reservoir which may be mounted on the machine base 12 or other suitable support.

In order to translate the reciprocable movement of the piston 52 within the chamber 54 into axial movement of the draw tube 40 within the spindle sleeve 38, the piston and draw tube are connected through the end bearing assembly 46. As illustrated in the drawings, the piston 52 is rigidly mounted by means of a locking ring 66 and a lock nut 68 on an axial piston sleeve 70 through which passes the outer portion 40a of the draw tube 40. It will be observed that the piston sleeve 70 is slidably mounted in the openings 58 and 60 of the plates 50 and 56, so that the piston 52 and sleeve 70 may reciprocate axially as a unit.

The outer end of the piston sleeve 70 projects from the cylinder 45 and is formed at its end with an outwardly facing cup portion 70a closed by a plate 72, thereby defining an annular recess for reception of a thrust bearing 74 in which the draw tube 40a is journaled. In order to operatively connect the non-rotating piston sleeve 70 with the rotating draw tube 40, the inner race 74a of the thrust bearing 74 is made rigid with the draw tube by means of a locking ring 76 and collar 78. A knurled hand wheel 79, in screw threaded engagement with the outer periphery of the draw tube 40a is provided for locking the collar 78 and bearing 74 within the cup 70a. The outer race 74b of the bearing is wedged into the non-rotating cup 70a. In this way, the balls 80 transmit the sliding motion of the piston sleeve 70 to the rotating draw tube 40. For the purpose of maintaining the piston sleeve 70 free from slight rotation due to friction in the bearing 74, a guide stud 82 extends from the rear end plate 50 of the cylinder 45, and is received in a horizontal guide passage 84 formed in the cup 70a of the sleeve.

Thus it is seen that the draw tube 40 is shifted axially within the spindle sleeve 38 in accordance with the reciprocal motion of the piston and sleeve 52, 70, within the chamber 54 so as to axially shift the collet 34 between open and closed positions.

For the purpose of coacting with the end bearing 74 in transmitting the collet clamping loads through the actuator 44, a second thrust bearing 86 is disposed within the inner end of the cylinder 45 for rotatively supporting the outer end 38a of the spindle sleeve 38. A third bearing 90, arranged within the cylinder 45 in spaced relationship to the thrust bearing 86, is used to provide outboard support for the cylinder 45 on the spindle 20 thereby to insure precise alinement between the members. It will be noted that the sleeve 38a is snugly encased in a short, heavy adapter sleeve 88 which is journaled in the bearings 86, 90.

The bearings 86, 90, are anchored in position within the cylinder in properly spaced relation by suitable collars 92.

As a result of the above, the entire actuator 44 remains stationary while the spindle 20 rotates. It is found that the pressure fluid connections 62, 64, suffice to steady the slight rotative counteraction set up in the cylinder due to the bearing friction. Powerful thrust may be imparted to the collet in either direction yet the actuator is free of rigid connection to the machine base. Furthermore, none of the thrust for operating the collet need be transmitted through the machine spindle bearings 22, 24, so that the life of these bearings is greatly extended.

For the purpose of keying the outer spindle sleeve 38 with the inner draw tube 40 and to permit quick removal of the tube from the sleeve, a pin and slot type locking assembly 100 is provided on the adapter sleeve 88 adjacent the inner end plate 48 of the cylinder 45. A bushing 102 is rigidly mounted on the adapter sleeve 88 in a radial direction thereto. An axially movable plunger or pin 104 extends through the bushing and the outer sleeve 38 so that its inner end is adapted to engage a longitudinal slot 106 provided in the draw tube 40. For biasing the plunger 104 inwardly into engagement with the slot 106, the bushing 102 houses therein a compression spring 108. It will be observed that the slot 106 is elongated to accommodate the axial movement of the draw tube 40 with the pin 104 engaged.

Normally, the pin 104 is engaged in the slot 106. By completely disengaging the hand wheel 79 from the draw tube 40a and the end plate 72 from the bearing assembly 46 and then releasing the pin from engagement with the slot, the draw tube 40 may be easily removed endwise from the spindle sleeve 38 upon unscrewing the tube 40 and collet 34.

While the operation of the actuator 44 will be understood in view of the foregoing discussion, it may be helpful to summarize it briefly.

When it is desired to place a workpiece 33 in the machine while the spindle 20 is rotating, an operator directs pressure fluid by means of an appropriate valve or the like from a suitable pump to the chamber 54 through the connection 62 so that the piston 52 and integral piston sleeve 70 are shifted inwardly in the chamber. The sliding but non-rotating action of the piston sleeve 70 is then transmitted to the rotating and sliding spindle draw tube 40 through the end bearing assembly 46 so that the collet 34 axially connected to the inner end of the draw tube moves inwardly and the collet fingers 36 are cammed by the cone 32 gripping engagement with the workpiece. Since the end thrust bearing 74 and the cylinder thrust bearing 86 are adapted to transmit both radial and thrust forces in coupling the piston sleeve 70 with the draw tube 40, these bearings transmit the clamping forces encountered when the collet grips the workpiece. In order to release the workpiece, the collet 34 is opened by switching the pressure fluid source to the connection 64 and thereby forcing the piston 52, piston sleeve 70, draw tube 40 and collet 34 outwardly so as to release the pressure exerted by the cone 32 on the fingers 36 of the collet. In the movements of the piston 52 within the chamber 54, pressure fluid is, of course, drained from behind the piston and returned to a fluid reservoir through the one of the pressure fluid connections 62, 64, which is not supplying fluid.

One of the advantages of the present arrangement is that a collet actuator is provided which includes anti-friction bearings therein for supporting the weight of the actuator from the outer end of a machine spindle as well as for transmitting the collet clamping loads encountered in gripping a workpiece. This feature is especially important since the axial component of collet clamping loads encountered in practice often attains 9,000 pounds force and greater. It is found that the transmission of these forces through the actuator construction rather than through the machine spindle bearings results in a durable and long lasting machine and collet actuator combination.

We claim as our invention:

1. In a machine tool having an elongated hollow spindle, a collet at one end of the spindle, means mounting said spindle and collet for rotary movement and driving means for rotating the spindle and collet, the collet being movable longitudinally of the spindle in one direction to grip a workpiece and in the opposite direction to release the workpiece, the combination comprising an elongated draw member slidable within the spindle and secured at one end to said collet, means for rotatively securing said draw member with said spindle for rotation whenever the spindle rotates, a stationary cylinder journaled about the other end of said spindle and carried thereon by a plurality of anti-friction bearings disposed in said cylinder, a non-rotating piston reciprocably mounted in said cylinder in spaced relation to said collet, means for operatively connecting said piston with said draw member including a thrust bearing and a sleeve member telescoped over said draw member and rigidly connecting the thrust bearing with the piston for translating the reciprocable piston motion into slidable motion of said rotating draw member, and means for supplying pressure fluid alternately to opposite sides of the piston to shift it longitudinally of the spindle and thereby positively operate said collet to grip or release the workpiece.

2. In a machine tool, the combination comprising an elongated hollow rotary spindle, a collet at one end of said spindle, means mounting said spindle and collet for rotary movement, driving means for rotating the spindle and collet, said collet being movable longitudinally of the spindle in one direction to grip a workpiece and in the opposite direction to release the workpiece, an elongated draw member secured at one end to said collet and slidably coupled for rotation with said spindle, means for reciprocating said draw member within said spindle for gripping and releasing the workpiece, said means including a non-rotating piston and cylinder assembly journaled about the other end of said spindle and supported solely thereby and a connecting assembly for translating the reciprocal motion of said piston into slidable motion of said rotating draw member, said connecting assembly including a sleeve member integral with the piston and telescoped over said draw member for connecting the piston to the draw member.

3. In a machine tool, the combination comprising an elongated hollow rotary spindle, a collet at one end of said spindle, means mounting said spindle and collet for rotary movement, driving means for rotating the spindle and collet, said collet being movable longitudinally of the spindle in one direction to grip a workpiece and in the opposite direction to release the workpiece, a stationary cylinder journaled about and completely supported by said spindle by means of anti-friction bearings carried by said cylinder, a piston reciprocably mounted in said cylinder and axially aligned with said spindle in spaced relation to said collet, means for supplying pressure fluid alternately to opposite sides of the piston to shift it longitudinally of the spindle, and means connecting the piston with the collet for alternately opening and closing the latter as the piston is moved by said pressure fluid, said connecting means including a thrust bearing carried by a member telescoped over said draw member for permitting relative rotation of the collet.

4. In a machine tool having an elongated hollow spindle, a collet at one end of the spindle, means mounting said spindle and collet for rotary movement, and driving means for rotating the spindle and collet, the collet being movable longitudinally of the spindle in one direction to grip a workpiece and in the opposite direction to release the workpiece, the combination comprising an elongated draw member slidable within the spindle and secured at one end to the collet, a stationary cylinder journaled about said spindle and carried thereon by a plurality of anti-friction bearings disposed in said cylinder, a non-rotating piston reciprocably mounted in said cylinder in spaced relation to said collet, means including a sleeve integrally formed with the piston and carrying a thrust bearing for operatively connecting said piston with said draw member, and means for supplying pressure fluid alternately to opposite sides of the piston to shift it longitudinally of the spindle and thereby positively operate said collet to grip or release the workpiece.

5. In a machine tool, the combination comprising a spindle head, a hollow spindle, said spindle having a collet at one end and having an outboard extension at its other end, means for driving said spindle, a hollow draw tube in said spindle coupled to the collet for opening and closing the same, an actuator for said draw tube, said actuator having a cylinder and a double acting piston mounted therein for endwise movement, means including a first thrust bearing for supporting the actuator axially on the outboard extension of said spindle, means including a sleeve integrally formed with the piston and telescoped over the draw tube and carrying a second thrust bearing for connecting the end of the draw tube to the piston, and non-rigid means for supplying pressure fluid to said actuator and for preventing rotation of the actuator as a result of bearing friction.

6. In a machine tool, the combination comprising a spindle head, a hollow spindle, said spindle having a collet at one end and having an outboard extension at its other end, means for driving said spindle, a draw member for actuating the collet, an actuator for said draw member, said actuator having a double acting cylinder and a piston mounted therein for reciprocable movement, means including a thrust bearing for connecting the end of the draw member to the piston, means including a member integrally formed with the piston and carrying a bearing for rotatably mounting the actuator on the outboard extension of said spindle, and non-rigid means for supplying pressure fluid to said cylinder for preventing rotation thereof as a result of bearing friction.

References Cited in the file of this patent
UNITED STATES PATENTS

| | | |
|---|---|---|
| 926,761 | Oliver | July 6, 1909 |
| 1,118,072 | Thompson | Nov. 24, 1914 |
| 2,455,586 | Kooima | Dec. 7, 1948 |
| 2,698,754 | Bernstein | Jan. 4, 1955 |